(12) United States Patent
Shiriike

(10) Patent No.: US 9,011,283 B2
(45) Date of Patent: Apr. 21, 2015

(54) FRICTION DRIVE BELT

(71) Applicant: Bando Chemical Industries, Ltd., Kobe-shi (JP)

(72) Inventor: Hiroyuki Shiriike, Kobe (JP)

(73) Assignee: Bando Chemical Industries, Ltd., Kobe-Shi (JP)

( * ) Notice: Subject to any disclaimer, the term of this patent is extended or adjusted under 35 U.S.C. 154(b) by 0 days.

(21) Appl. No.: 13/867,445

(22) Filed: Apr. 22, 2013

(65) Prior Publication Data
US 2013/0237354 A1  Sep. 12, 2013

Related U.S. Application Data

(63) Continuation of application No. PCT/JP2011/005788, filed on Oct. 17, 2011.

(30) Foreign Application Priority Data

Oct. 21, 2010  (JP) ................. 2010-236734

(51) Int. Cl.
  *F16G 5/00*  (2006.01)
  *F16G 1/28*  (2006.01)
  *F16G 5/20*  (2006.01)
  *F16G 1/00*  (2006.01)
  *F16G 5/06*  (2006.01)

(52) U.S. Cl.
  CPC .. *F16G 1/28* (2013.01); *F16G 5/06* (2013.01); *F16G 5/20* (2013.01)

(58) Field of Classification Search
  CPC ............... F16G 5/20; F16G 1/28; F16G 5/06; F16G 5/166; B29D 29/103
  USPC .......................................... 474/249, 238, 263
  See application file for complete search history.

(56) References Cited

U.S. PATENT DOCUMENTS

| | | | | |
|---|---|---|---|---|
| 383,373 A * | 5/1888 | Schieren | 474/249 |
| 1,028,783 A * | 6/1912 | Von Rabenau | 474/251 |
| 1,404,848 A * | 1/1922 | Gusdorf | 474/249 |
| 1,457,243 A * | 5/1923 | Gusdorf | 474/249 |
| 1,457,569 A * | 6/1923 | Gusdorf | 474/249 |
| 1,661,300 A * | 3/1928 | Perpall | 474/249 |
| 1,770,301 A * | 7/1930 | De Bruin | 474/249 |
| 1,815,879 A * | 7/1931 | Alexander | 474/249 |
| 1,860,269 A * | 5/1932 | Stokes | 474/249 |
| 2,054,619 A * | 9/1936 | Freedlander | 474/249 |
| 2,181,001 A * | 11/1939 | Smith | 474/249 |
| 2,221,984 A * | 11/1940 | McKay | 474/249 |
| 2,295,432 A * | 9/1942 | Smith | 474/249 |
| 2,405,496 A * | 8/1946 | Gingras | 474/251 |
| 2,677,969 A * | 5/1954 | Waugh | 474/249 |

(Continued)

FOREIGN PATENT DOCUMENTS

| CN | 1940341 B | 9/2010 |
|---|---|---|
| JP | 2001-165244 A | 6/2001 |

(Continued)

*Primary Examiner* — Henry Liu
(74) *Attorney, Agent, or Firm* — Knobbe Martens Olson & Bear LLP

(57) ABSTRACT

A friction drive belt has a pulley contact portion of a belt body, and at least the pulley contact portion is made of a rubber composition. Numerous pores are formed in a surface of the pulley contact portion of the belt body, and numerous small protrusions having an average height of 4-40 μm are formed to protrude from the surface.

14 Claims, 12 Drawing Sheets

(56) References Cited

U.S. PATENT DOCUMENTS

| | | | |
|---|---|---|---|
| 3,473,400 A * | 10/1969 | Garbin et al. | 474/260 |
| 5,055,090 A * | 10/1991 | Miranti, Jr. | 474/249 |
| 5,211,608 A * | 5/1993 | Wong et al. | 474/202 |
| 5,215,504 A * | 6/1993 | Wong et al. | 474/237 |
| 7,988,577 B2 * | 8/2011 | Omori et al. | 474/249 |
| 2007/0082777 A1 | 4/2007 | Nishida et al. | |
| 2009/0264236 A1 * | 10/2009 | Omori et al. | 474/238 |
| 2009/0298632 A1 * | 12/2009 | Shiriike et al. | 474/263 |
| 2010/0069190 A1 * | 3/2010 | Yoshida | 474/265 |
| 2010/0203993 A1 * | 8/2010 | Matsukawa et al. | 474/251 |
| 2010/0203994 A1 * | 8/2010 | Fujikawa et al. | 474/263 |
| 2010/0323835 A1 | 12/2010 | Furukawa et al. | |
| 2010/0331129 A1 * | 12/2010 | Mukai et al. | 474/237 |
| 2012/0058849 A1 * | 3/2012 | Yoshida | 474/148 |

FOREIGN PATENT DOCUMENTS

| | | |
|---|---|---|
| JP | 2006-064015 A | 3/2006 |
| JP | 2006-194357 A | 7/2006 |
| JP | 2007-255635 A | 10/2007 |
| JP | 2009-036302 A | 2/2009 |
| WO | WO 2008/007647 A1 | 1/2008 |
| WO | WO 2008/102911 A1 | 8/2008 |
| WO | WO 2009/101799 A1 | 8/2009 |

* cited by examiner

FRICTION DRIVE BELT

CROSS-REFERENCE TO RELATED APPLICATIONS

This is a continuation of International Application No. PCT/JP2011/005788 filed on Oct. 17, 2011, which claims priority to Japanese Patent Application No. 2010-236734 filed on Oct. 21, 2010. The entire disclosures of these applications are incorporated by reference herein.

BACKGROUND

The present disclosure relates to friction drive belts.

V-ribbed belts having a large number of pores on their surfaces, which are to contact pulleys, have been known.

For example, Japanese Patent Publication No. 2007-255635 describes a friction drive belt having a friction drive surface made of a porous rubber composition having an air content of 5-20% and containing ultra high molecular weight polyethylene as a lubricant.

Japanese Patent Publication No. 2006-064015 describes a friction drive belt having a friction drive surface made of a rubber composition into which short fibers that are not subjected to a surface treatment are blended, wherein holes due to the loss of the short fibers and/or spaces each formed between the short fiber and the rubber are formed on the surface of the friction drive belt.

Japanese Domestic Re-Publication of PCT International Application No. 2008/007647 describes a friction drive belt in which at least a part of a belt body in contact with a pulley, is made of an elastomer composition, wherein a large number of cellular pores of hollow particles are formed in a pulley contacting surface.

Japanese Domestic Re-Publication of PCT International Application No. 2009/101799 describes a friction drive belt for transmitting power which is wrapped around a pulley such that a compression rubber layer provided on an inner periphery of a belt body is in contact with the pulley, wherein the compression rubber layer in which a plurality of pores of hollow particles having an average pore size of 5-120 μm are formed has an air content of 5-40%.

SUMMARY

The present disclosure relates to a friction drive belt in which at least a pulley contact portion of a belt body is made of a rubber composition, wherein numerous pores are formed in a surface of the pulley contact portion of the belt body, and numerous small protrusions having an average height of 4-40 μm are formed to protrude from the surface.

DETAILED DESCRIPTION

An embodiment will be described below in detail with reference to the drawings.

Figure 1:
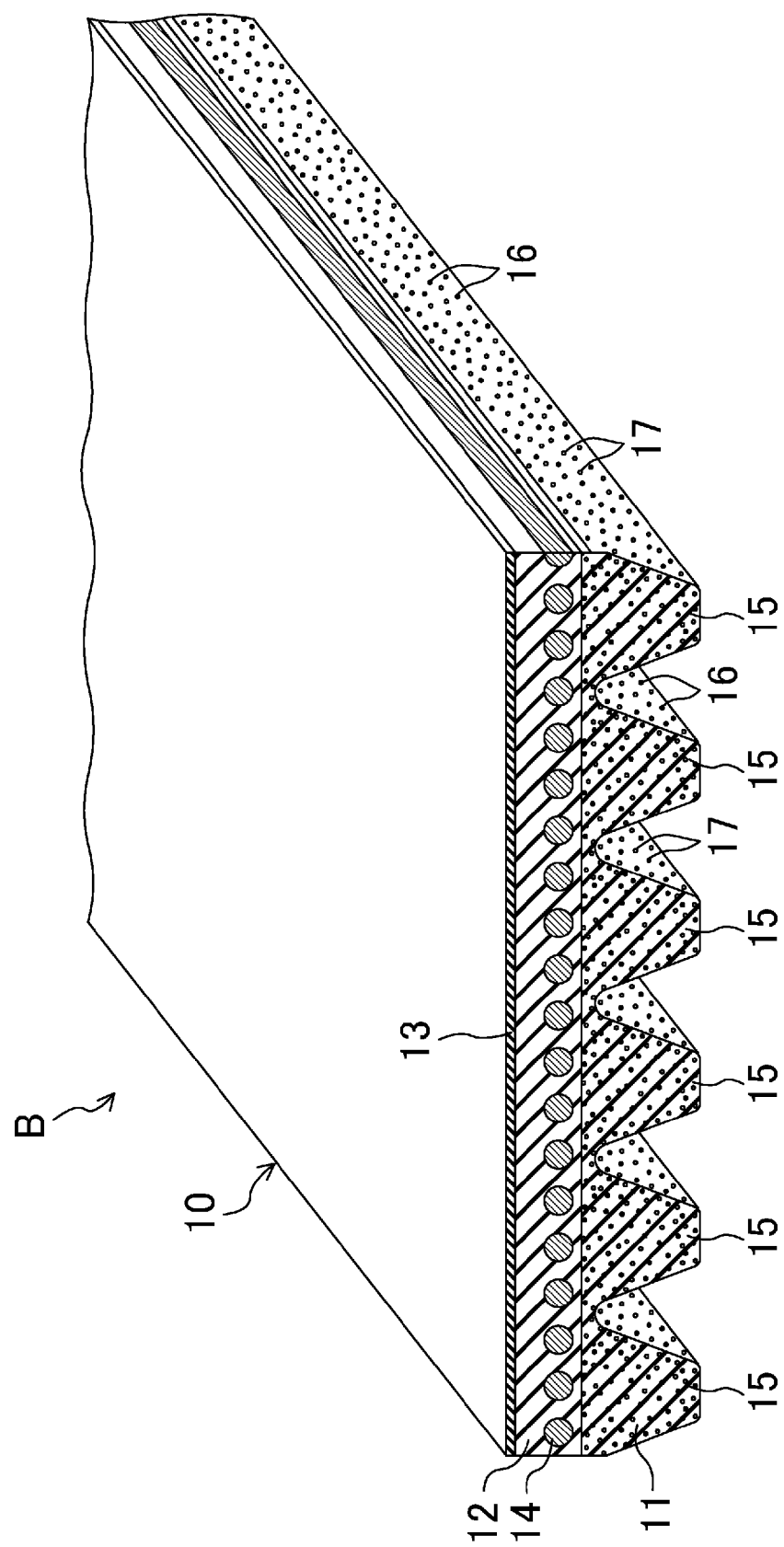
FIG. 1 is a perspective view illustrating a V-ribbed belt according to an embodiment.

FIG. 1 illustrates a V-ribbed belt B (a friction drive belt) according to the embodiment. The V-ribbed belt B of this embodiment is used in, for example, an accessory drive belt transmission system provided in an engine room of an automobile. The V-ribbed belt B of this embodiment has a belt length of 700-3000 mm, a belt width of 10-36 mm and a belt thickness of 4.0-5.0 mm.

The V-ribbed belt B of this embodiment includes a V-ribbed belt body 10 having a three-layer structure made of a compression rubber layer 11 provided on the inner periphery of the belt, an intermediate adhesion rubber layer 12, and a backing rubber layer 13 provided on the outer periphery of the belt. The adhesion rubber layer 12 of the V-ribbed belt body 10 includes a cord 14 embedded therein in a spiral having pitches adjacent to each other along the belt width.

The compression rubber layer 11 has a plurality of V-shaped ribs 15 constituting a pulley contact portion, and rising inward relative to the inner periphery of the belt. The V-shaped ribs 15 are each formed into a rib extending along the belt length and having a cross section in a substantially inverted triangular shape, and are arranged adjacent to each other along the belt width. Each of the V-shaped ribs 15 has, for example, a rib height of 2.0-3.0 mm and a width of 1.0-3.6 mm at its root. The number of the V-shaped ribs is, for example, from three to six (six in FIG. 1).

The compression rubber layer 11 is made of a rubber composition produced by kneading a blend of a rubber component and various compounding agents including a cross-linker to form an uncrosslinked rubber composition, heating and pressing the uncrosslinked rubber composition, and crosslinking the uncrosslinked rubber composition by the cross-linker.

Examples of the rubber component of the rubber composition forming the compression rubber layer 11 include: ethylene-α-olefin elastomers such as ethylene propylene copolymer (EPR), ethylene-propylene-diene terpolymer (EPDM), ethylene-octene copolymer, and ethylene-butene copolymer; chloroprene-rubber (CR); chlorosulfonated polyethylene rubber (CSM); and hydrogenated acrylonitrile rubber (H-NBR). Among the examples, an ethylene-α-olefin elastomer is preferably used as the rubber component. The rubber component may include either a single species or a mixture of two or more species.

Examples of the compounding agents include reinforcing agents such as carbon blacks, softeners, processing aids, vulcanization aids, cross-linkers, vulcanization accelerators, and resins for rubber compounding.

Examples of the carbon blacks used as the reinforcing agents include: channel black; furnace black such as SAF, ISAF, N-339, HAF, N-351, MAF, FEF, SRF, GPF, ECF, and N-234; thermal black such as FT and MT; and acetylene black. Silica may also be used as the reinforcing agent. The reinforcing agent may include either a single species or two or more species. In order that resistance to wear and resistance to bending fatigue will be well balanced, 30-80 parts by mass of the reinforcing agent is preferably blended into 100 parts by mass of the rubber component.

Examples of the softeners include: petroleum softeners; mineral oil-based softeners such as paraffin wax; and vegetable oil based-softeners such as castor oil, cottonseed oil, linseed oil, rapeseed oil, soybean oil, palm oil, coconut oil, peanut oil, Japan wax, rosin, and pine oil. The softener may be made of either a single species or two or more species. For example, 2-30 parts by mass of the softener is blended into 100 parts by mass of the rubber component.

Examples of the processing aids include stearic acids. The processing aid may include either a single species or two or more species. For example, 0.5-5 parts by mass of the processing aid is blended into 100 parts by mass of the rubber component.

Examples of the vulcanization aids include metal oxides such as magnesium oxide and zinc oxide (zinc white). The vulcanization aid may include either a single species or two or more species. For example, 1-10 parts by mass of the vulcanization aid is blended into 100 parts by mass of the rubber component.

Examples of the cross-linkers include sulfur and organic peroxides. Sulfur or an organic peroxide may be used alone as the cross-linker. Both of sulfur and the organic peroxide may also be used in combination. For example, 0.5-4.0 parts by mass of sulfur as the cross-linker is blended into 100 parts by mass of the rubber component. For example, 0.5-8 parts by mass of the organic peroxide as the cross-linker is blended into 100 parts by mass of the rubber component.

Examples of the resins for rubber compounding include phenolic resin. The resin for rubber compounding may include either a single species or two or more species. For example, 0-20 parts by mass of the resin for rubber compounding is blended into 100 parts by mass of the rubber component.

Examples of the vulcanization accelerators include metal oxides, metal carbonates, fatty acids and the derivatives thereof. The vulcanization accelerator may include either a single species or two or more species. For example, 0.5-8 parts by mass of the vulcanization accelerator is blended into 100 parts by mass of the rubber component.

It is preferable that the rubber composition forming the compression rubber layer 11 not contain short fibers. However, the rubber composition may contain the short fibers. If it contains the short fibers, the short fibers are preferably oriented in the belt width direction. Part of the short fibers exposed at the pulley contact surface preferably has their ends protruding from the pulley contact surface. Examples of the short fibers include nylon short fibers, aramid short fibers, polyester short fibers, and cotton short fibers. For example, the short fibers may be manufactured through an adhesion treatment in which the fibers are soaked in a resorcinol formaldehyde latex aqueous solution (an RFL aqueous solution) and then heated. The short fibers have a length of 0.2-3.0 mm, for example. For example, 3-30 parts by mass of the short fibers are blended into 100 parts by mass of the rubber component.

Numerous pores 16 are formed on the surfaces of the V-shaped ribs 15 in the compression rubber layer 11. The average pore size of the pores 16 is preferably 70-120 $\mu$m and more preferably 100-120 $\mu$m. The average pore size of the pores 16 can be calculated based on a number-average pore size of 50-100 pores measured by means of a surface image.

The pores 16 may be made of partially removed hollow particles blended into the rubber composition forming the compression rubber layer 11. Examples of the hollow particles include, e.g., thermally expandable hollow particles within which a solvent is encapsulated. The particle size of the hollow particles is preferably 15-50 $\mu$m and more preferably 25-35 $\mu$m. The hollow particles may include either a single species or two or more species. The hollow particles are blended preferably in an amount of 0.5-15 parts by mass and more preferably in an amount of 1-5 parts by mass into 100 parts by mass of the rubber component.

The pores 16 may be formed by partially removed hollows foamed by a foaming agent blended into the rubber composition forming the compression rubber layer 11. The foaming agent may include either a single species or two or more species. The foaming agent is blended preferably in an amount of 1-20 parts by mass and more preferably in an amount of 5-15 parts by mass into 100 parts by mass of the rubber component.

The pores 16 may also be formed by partially removed hollows foamed by impregnating uncrosslinked rubber with supercritical or subcritical fluid, and then changing the supercritical or subcritical fluid to gas in a rubber processing step for the rubber composition forming the compression rubber layer 11.

Numerous small protrusions 17 are formed on the surfaces of the V-shaped ribs 15 in the compression rubber layer 11. The average height of the small protrusions 17 is 4-40 $\mu$m, preferably 10-30 $\mu$m, and more preferably 15-20 $\mu$m. The average height of the small protrusions 17 can be calculated based on a number-average height of 50-70 protrusions measured by means of a surface image. The average outer diameter of the small protrusions 17 is preferably 50-120 $\mu$m and more preferably 100-120 $\mu$m. The average outer diameter of the small protrusions 17 can be calculated based on a number-average outer diameter of 50-100 protrusions measured by means of a surface image.

The small protrusions 17 may be made of part of solid particles exposed on the surface, and the solid particles are blended into the rubber composition forming the compression rubber layer 11. Examples of the solid particles include: ultra high molecular weight polyethylene particles (for example, weight average molecular weight of one million or more); resin particles such as a nylon resin; melamine; and aramid. When an ethylene-α-olefin elastomer is used as the rubber component of the rubber composition forming the compression rubber layer 11, high molecular weight polyethylene particles are preferably used as the solid particles. That is because the high molecular weight polyethylene particles have an affinity with the rubber component, and are excellent in dispersibility, thereby making it possible to reduce a decrease in strength due to the blend of the solid particles, and in addition, the friction coefficient of the surfaces of the V-shaped ribs 15 is reduced, leading to reduction of the noise. The particle size of the solid particles is preferably 25-180 $\mu$m and more preferably 50-150 $\mu$m. The solid particles may include either a single species or two or more species. The solid particles are blended preferably in an amount of 5-40 parts by mass and more preferably in an amount of 10-20 parts by mass into 100 parts by mass of the rubber component.

The adhesion rubber layer 12 is formed into a band shape with a rectangular cross section that is longer in the horizontal direction than in the vertical direction, and has a thickness of 1.0-2.5 mm, for example. The backing rubber layer 13 is also formed into a band shape with a rectangular cross section that is longer in the horizontal direction than in the vertical direction, and has a thickness of 0.4-0.8 mm, for example. In order to reduce noise generated between the belt back face and a flat pulley in contact with the belt back face, the surface of the backing rubber layer 13 preferably has a transferred weave pattern of woven fabric.

Each of the adhesion rubber layer 12 and the backing rubber layer 13 is preferably made of a rubber composition produced by kneading a blend of a rubber component and various compounding agents including a cross-linker to form an uncrosslinked rubber composition, heating and pressing the uncrosslinked rubber composition, and crosslinking the uncrosslinked rubber composition by the cross-linker. In order to reduce adhesion produced by contact between the belt back face and the flat pulley, the backing rubber layer 13 is preferably made of a rubber composition which is slightly harder than that of the adhesion rubber layer 12.

Examples of the rubber components for the rubber compositions forming the adhesion rubber layer 12 and the backing rubber layer 13 include ethylene-α-olefin elastomers, chloroprene-rubber (CR), chlorosulfonated polyethylene rubber (CSM) and hydrogenated acrylonitrile rubber (H-NBR). The rubber component of the adhesion rubber layer 12 and the backing rubber layer 13 is preferably the same as that of the compression rubber layer 11.

In a manner similar to the compression rubber layer 11, examples of the compounding agents include reinforcing agents such as carbon blacks, softeners, processing aids, vulcanization aids, cross-linkers, vulcanization accelerators, resins for rubber compounding, and antioxidants.

The rubber compositions forming the compression rubber layer 11, the adhesion rubber layer 12, and the backing rubber layer 13 may be either different from each other or the same in constitution.

The cord 14 is made of twisted yarn of polyester fibers (PET), polyethylene naphthalate fibers (PEN), aramid fibers, vinylon fibers, etc. In order that the cord 14 has adhesion to the V-ribbed belt body 10, the cord 14 is subjected to an adhesion treatment in which the cord 14 is soaked in an RFL aqueous solution and then heated and/or an adhesion treatment in which the cord 14 is soaked in rubber cement and then dried, prior to molding the V-ribbed belt.

Meanwhile, there is a growing need for alleviation of noise produced in traveling automobiles. Such a need has created demands for a V-ribbed belt running in an engine room to reduce slip noise generated in running of the V-ribbed belt in a wet state, and to alleviate reduction of power transmission capacity in running of the V-ribbed belt in a wet state.

Figure 2:
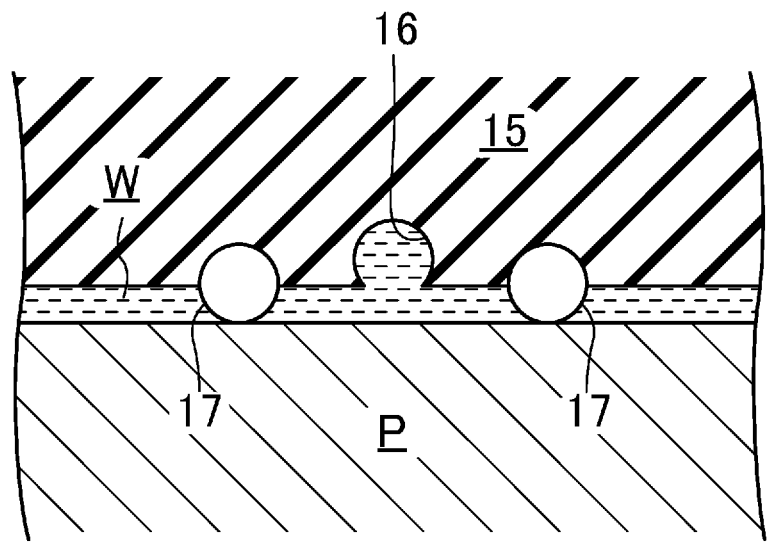
FIG. 2 is an illustration of the effects of the V-ribbed belt according to the embodiment.

To meet the demands for the reduction of the generation of slip noise, and the alleviation of reduction of power transmission capacity in running of the belt in a wet state, in the V-ribbed belt B having the structure described in the embodiment, the numerous pores 16 and the numerous small protrusions 17 having an average height of 4-40 µm are formed on the surfaces of the V-shaped ribs 15, and as illustrated in FIG. 2, water W flows into the pores 16, and a path of the water W is formed in a gap, generated by the small protrusions 17, between the V-ribbed ribs 15 and a pulley P, and such a structure efficiently drains the water, and as a result, it is possible to reduce the generation of slip noise and to alleviate the reduction of power transmission capacity. In order to ensure the wide path through which the water W flows, each of the pores 16 and each of the small protrusions 17 are preferably disposed adjacent to each other on the surfaces of the V-shaped ribs 15. The peak-to-valley distance between the pore 16 and the small protrusion 17 is preferably 45 µm or more. The surface of the belt is observed at magnification of, e.g., 400 times by using a laser microscope, and the depth of each of the pores 16 and the height of an adjacent one of the small protrusions 17 are measured and added, thereby obtaining the peak-to-valley distance between the pore 16 and the small protrusion 17 as an average value of 50-70 of the added measurements.

A method for fabricating the V-ribbed belt B of the embodiment will be described next.

Figure 3:
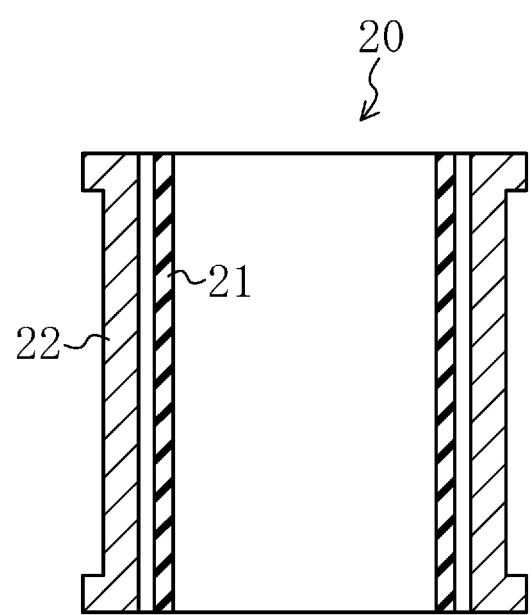
FIG. 3 is a longitudinal cross-sectional view of a belt forming mold.
Figure 4:
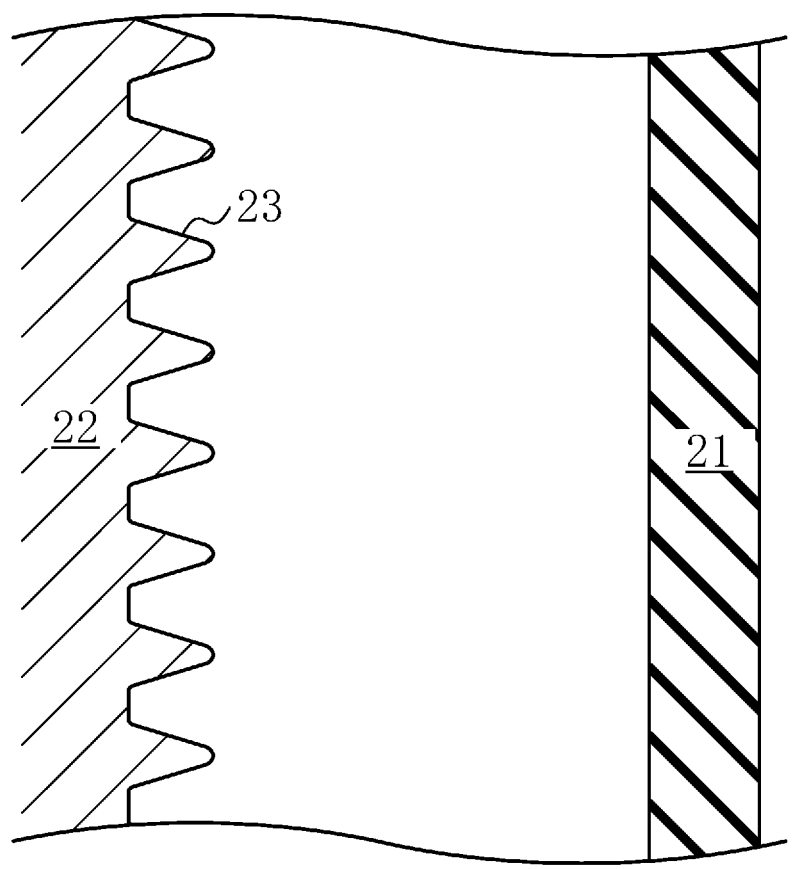
FIG. 4 is an enlarged longitudinal cross-sectional view of a portion of the belt forming mold.

As illustrated in FIGS. 3 and 4, a belt forming mold 20 is used to fabricate the V-ribbed belt B of the embodiment, the belt forming mold 20 including a cylindrical inner mold 21 and a cylindrical outer mold 22, which are provided concentrically.

In this belt forming mold 20, the inner mold 21 is made of a flexible material such as rubber. The outer mold 22 is made of a rigid material such as a metal. The inner periphery surface of the outer mold 22 serves as a molding surface, and grooves 23 for forming the V-shaped ribs are provided in the axial direction at regular intervals on the inner periphery surface of the outer mold 22. The outer mold 22 is provided with a temperature control mechanism which allows a heating medium such as water vapor or a cooling medium such as water to flow. This belt forming mold 20 is provided with a pressurizing means for pressurizing and expanding the inner mold 21 from the inside.

In fabrication of the V-ribbed belt B of this embodiment, a non-crosslinked rubber sheet 11' for the compression rubber layer is first produced by blending the compounding agents into the rubber component, kneading the resultant blend with a kneading machine such as a kneader and a Banbury mixer, and molding the resultant non-crosslinked rubber composition into a sheet shape by calender molding and the like. Elements for forming pores such as the hollow particles, the foaming agent, etc., and elements for forming small protrusions such as the solid particles etc. are included in the non-crosslinked rubber sheet 11' for the compression rubber layer. Non-crosslinked rubber sheets 12' and 13' for the adhesion rubber layer and the backing rubber layer are also produced in a similar manner. Twisted yarn 14' for forming the cord is subjected to the adhesion treatment in which the yarn is soaked in an RFL aqueous solution and then heated, and thereafter to the adhesion treatment in which the yarn is soaked in rubber cement and then dried.

Figure 5:
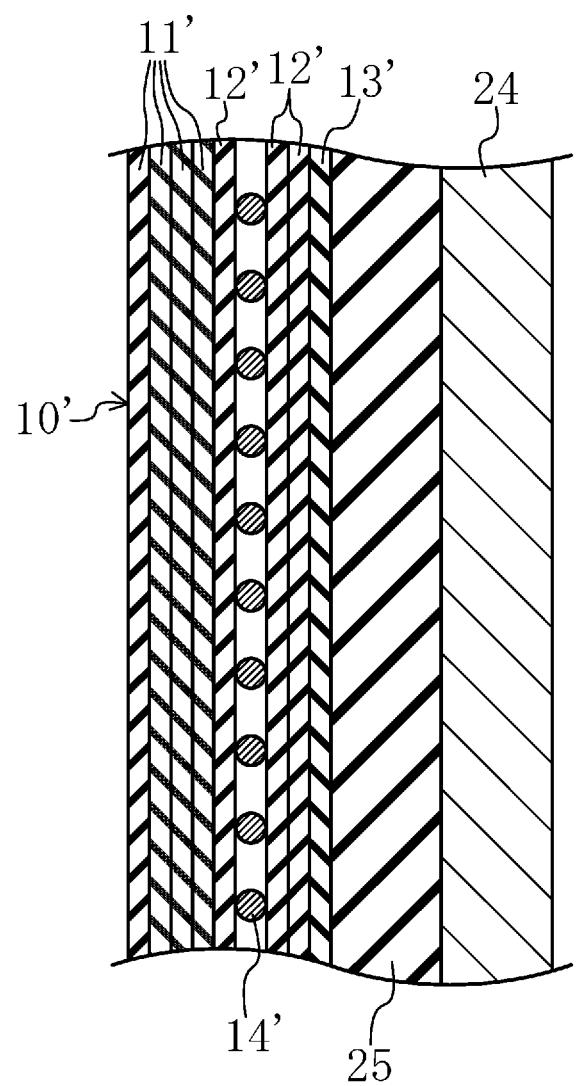
FIG. 5 is an illustration showing a step of forming a multilayer member.

Then, as illustrated in FIG. 5, a rubber sleeve 25 is placed on a cylindrical drum 24 having a smooth surface. Thereafter, the non-crosslinked rubber sheet 13' for the backing rubber layer and the non-crosslinked rubber sheet 12' for the adhesion rubber layer are wrapped around the rubber sleeve 25 in this order to form layers. The twisted yarn 14' for the cord is wrapped around the resultant layers in a helical manner with respect to the cylindrical inner mold 21. Further, the non-crosslinked rubber sheet 12' for the adhesion rubber layer, and the non-crosslinked rubber sheet 11' for the compression rubber layer are wrapped around over the twisted yarn 14' in this order, thereby producing a multilayer member 10'.

Figure 6:
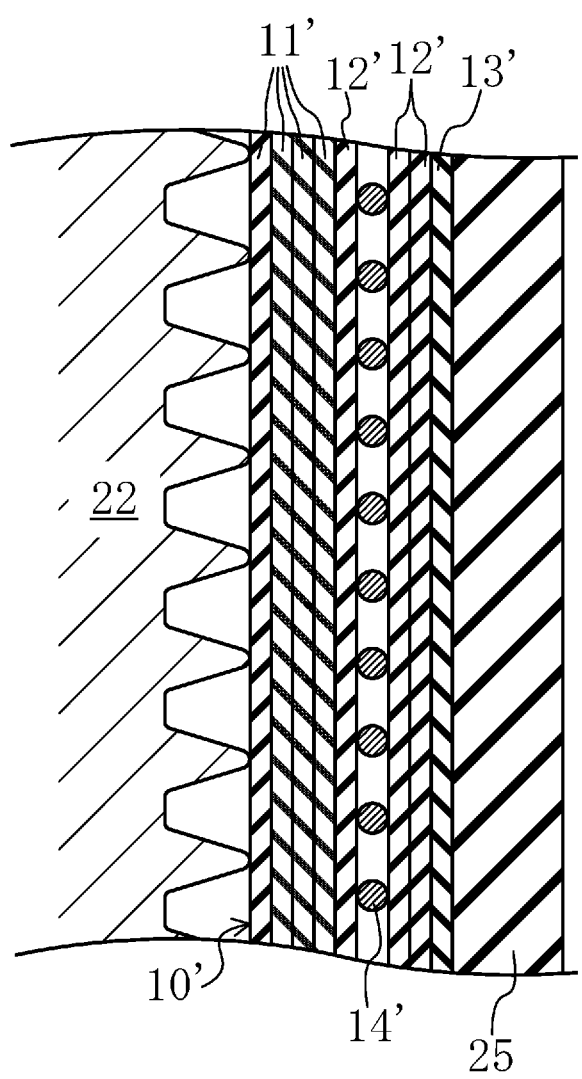
FIG. 6 is an illustration showing a step of setting the multilayer member in an outer mold.

The rubber sleeve 25 on which the multilayer member 10' is formed is subsequently removed from the cylindrical drum 24, and then put inside the outer mold 22, as illustrated in FIG. 6.

Figure 7:
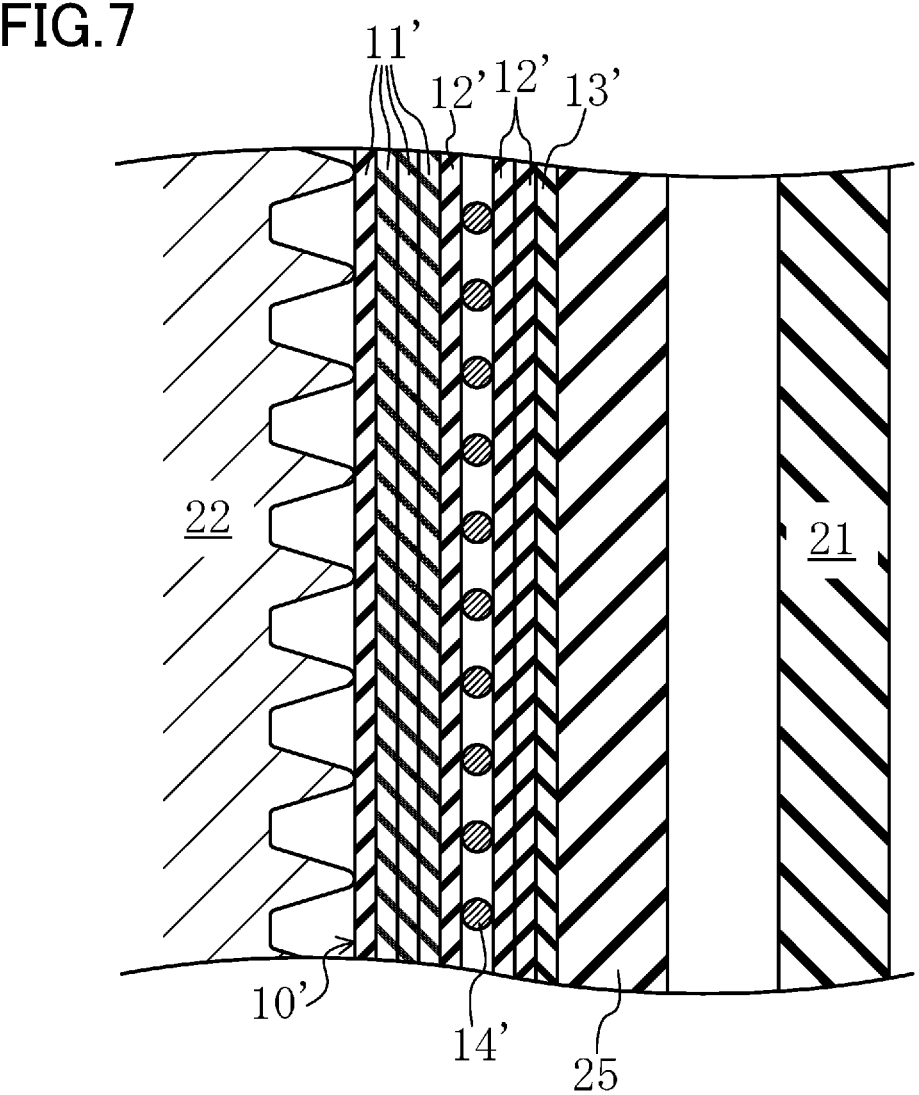
FIG. 7 is an illustration showing a step of setting the outer mold outside an inner mold.

Next, as illustrated in FIG. 7, the inner mold 21 is positioned inside the rubber sleeve 25 set in the outer mold 22, and then, hermetically sealed.

Figure 8:
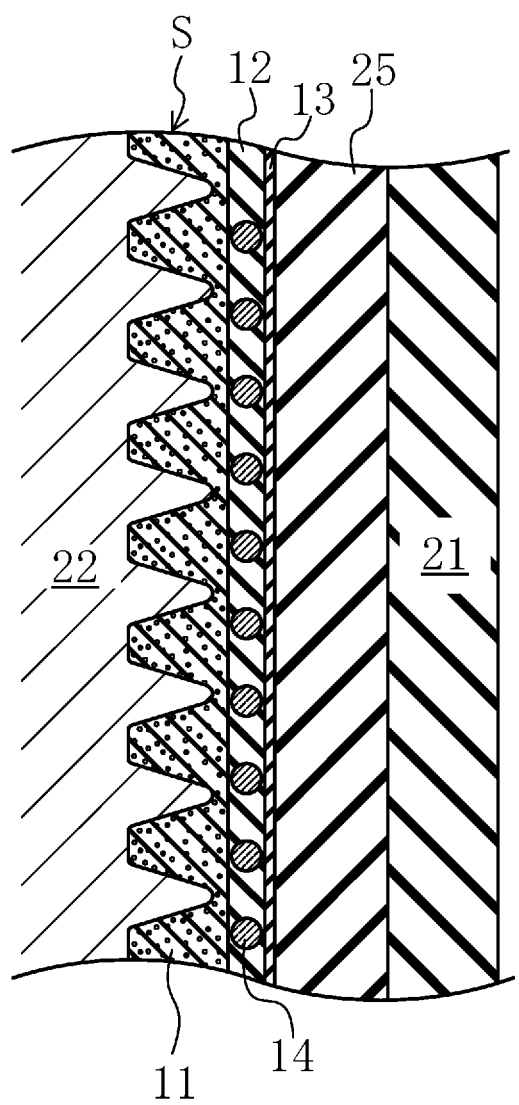
FIG. 8 is an illustration showing a step of forming a belt slab.

Subsequently, the outer mold 22 is heated and the inner mold 21 is pressurized by introducing, for example, high-pressure air into its hermetically-sealed inner space. In this step, as illustrated in FIG. 8, the inner mold 21 expands and the non-crosslinked rubber sheets 11', 12', and 13' for molding belt of the multilayer member 10' are compressed on the molding surface of the outer mold 22. At the same time, cross-linking is promoted in the sheets, and the sheets are integrated and combined with the twisted yarn 14'. Through these steps, a belt slab S in a cylindrical shape is formed. The molding temperature of the belt slab S is, for example, 100-180° C., the molding pressure thereof is, for example, 0.5-2.0 MPa, and the molding time is, for example, 10-60 minutes.

The inner space of the inner mold 21 is reduced in pressure to be released from the hermetically sealed state, and the belt slab S formed between the inner mold 21 and the outer mold 22 with the rubber sleeve 25 interposed therebetween is removed, and the surface having the V-shaped ribs 15 is grinded. This grinding partially cuts away the hollow particles or the hollows, thereby forming the numerous pores 16 on the surfaces of the V-shaped ribs 15, and this grinding also grinds and removes rubber around the solid particles to expose part of the solid particles on the surface, thereby forming the numerous small protrusions 17.

Finally, the belt slab S is cut into rings having a predetermined width, and each ring is turned inside out, thereby obtaining the V-ribbed belt B.

Next, an accessory drive belt transmission system for an automobile 30 using the V-ribbed belt B of the embodiment will be described.

Figure 9:
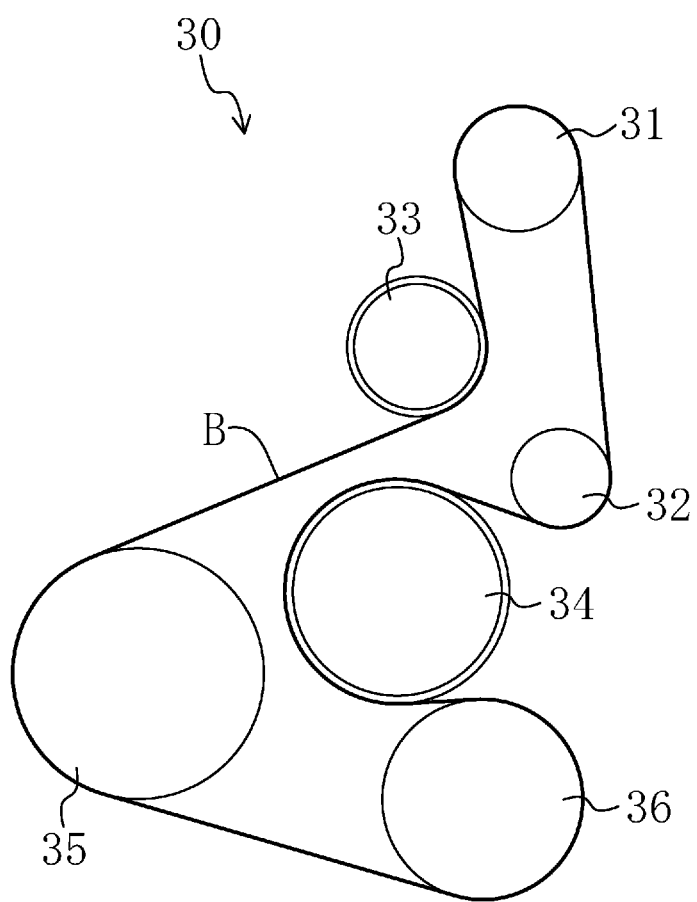
FIG. 9 is a diagram showing a layout of pulleys in an accessory drive belt transmission system for an automobile according to the embodiment.
Figure 10:
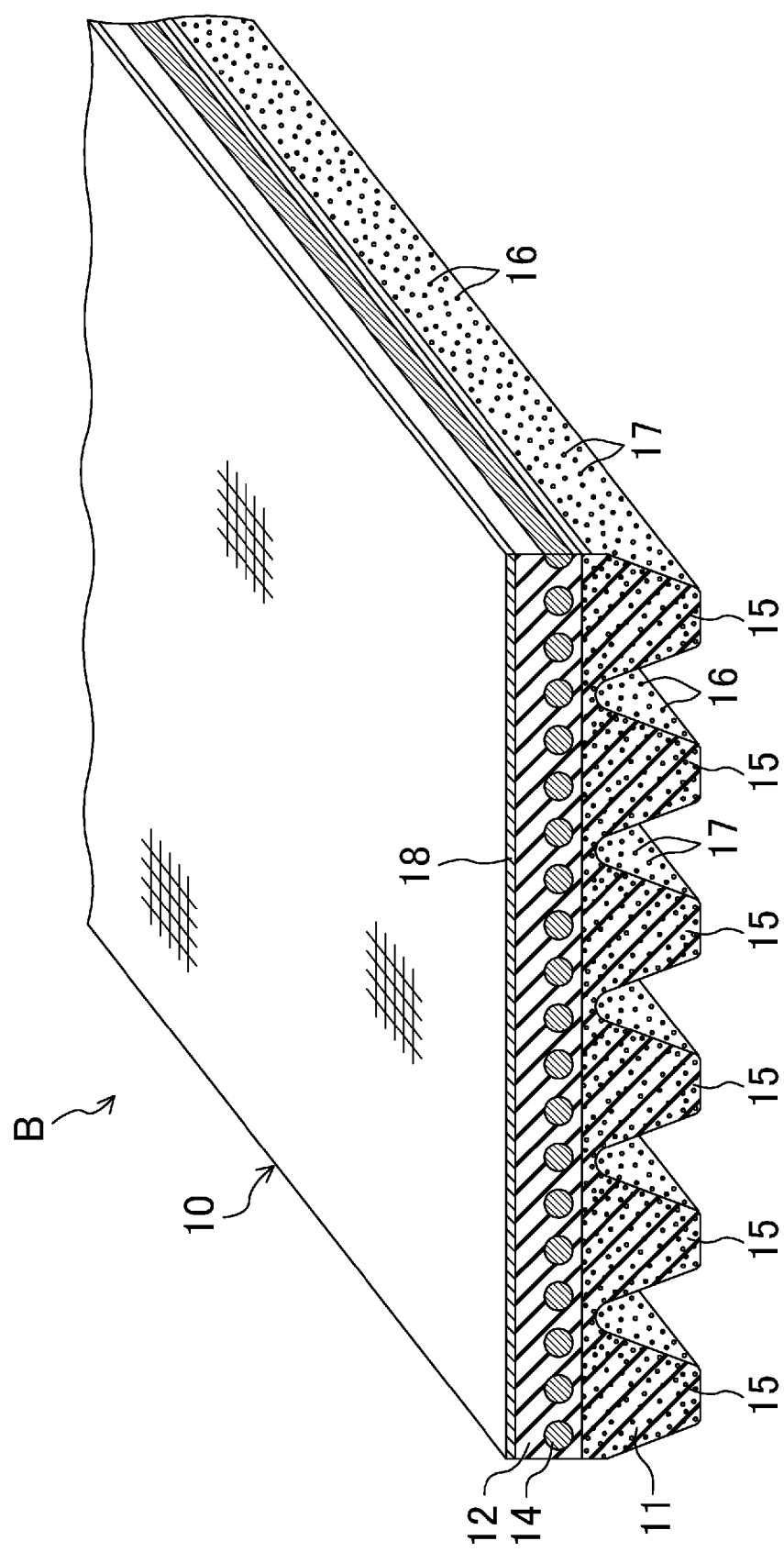
FIG. 10 is a perspective view illustrating a variation of the V-ribbed belt according to the embodiment.

FIG. 9 shows a layout of pulleys of the accessory drive belt transmission system 30 for an automobile using the V-ribbed belt B of this embodiment. This accessory drive belt transmission system 30 is a serpentine drive type system in which the V-ribbed belt B is wrapped around six pulleys including four ribbed pulleys and two flat pulleys to transmit power.

The accessory drive belt transmission system 30 includes: a power steering pulley 31 which is an uppermost ribbed pulley; an AC generator pulley 32 which is a ribbed pulley disposed below the power steering pulley 31; a tensioner pulley 33 which is a flat pulley disposed downwardly leftward of the power steering pulley 31; a water-pump pulley 34 which is a flat pulley disposed below the tensioner pulley 33; a crankshaft pulley 35 which is a ribbed pulley disposed downwardly leftward of the tensioner pulley 33; and an air-conditioner pulley 36 which is a ribbed pulley disposed downwardly rightward of the crankshaft pulley 35. These pulleys are made of, for example, a pressed metal product, a casting product, or a resin molding product made of a nylon resin or phenolic resin, and their pulley diameters are 50-150 mm.

In the accessory drive belt transmission system 30, the V-ribbed belt B is wrapped around the following components in the following order: the power steering pulley 31 with the surface having the V-shaped ribs 15 in contact with the power steering pulley 31; the tensioner pulley 33 with the belt back face in contact with the tensioner pulley 33; the crankshaft pulley 35 and then the air-conditioner pulley 36 with the surface having the V-shaped ribs 15 in contact with the pulleys 35 and 36; the water-pump pulley 34 with the belt back face in contact with the water-pump pulley 34; the AC generator pulley 32 with the surface having the V-shaped ribs 15 in contact with the AC generator pulley 32; and then the power steering pulley 31 again. Belt span lengths which are the lengths of the parts of the V-ribbed belt B between the pulleys are 50-300 mm, for example. Misalignment produced between the pulleys is 0-2°.

Though the V-ribbed belt B is applied as the friction drive belt in this embodiment, the present disclosure is not particularly limited to this embodiment. A raw-edge type V-belt may be applicable to the present disclosure.

Though the V-ribbed belt body 10 of this embodiment is constituted by the compression rubber layer 11, the adhesion rubber layer 12, and the backing rubber layer 13, the present disclosure is not particularly limited to this embodiment. The V-ribbed belt body 10 may be constituted by the compression rubber layer 11, the adhesion rubber layer 12, and reinforcement fabric 18, which is provided in place of the backing rubber layer 13. This reinforcement fabric 18 is made of, for example, woven fabric, knitted fabric, or unwoven fabric made of fibers such as cotton, polyamide fibers, polyester fibers, and aramid fibers.

Figure 11:
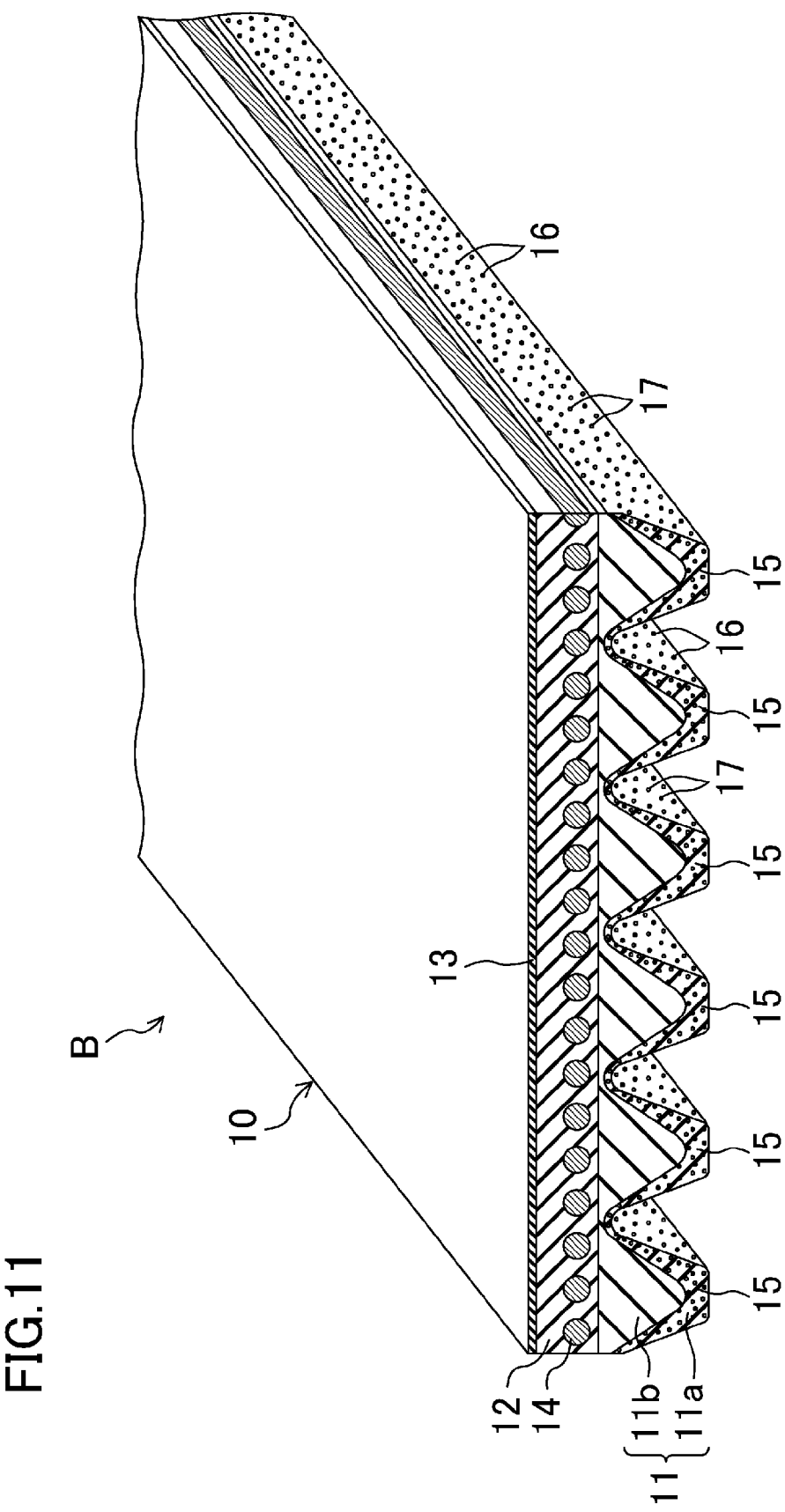
FIG. 11 is a perspective view illustrating another variation of the V-ribbed belt according to the embodiment.

Though the compression rubber layer 11 of this embodiment is constituted by a single layer of the rubber composition including the elements for forming the pores and the elements for forming the small protrusions, the present disclosure is not particularly limited to this embodiment. At least, the numerous pores 16 and the numerous small protrusions 17 may be formed in the surfaces of the V-shaped ribs 15 of the compression rubber layer 11 in the V-ribbed belt body 10. As illustrated in FIG. 11, the compression rubber layer 11 may include a surface rubber layer 11a formed into a layer shape extending along the entire pulley contact surface, and an inner rubber layer 11b provided toward the inside of the belt relative to the surface rubber layer 11a, where the surface rubber layer 11a is made of a rubber composition including the elements for forming the pores and elements for forming the small protrusions, whereas the inner rubber layer 11b is made of a rubber composition not including such elements.

Though the accessory drive belt transmission system 30 is described as the belt transmission system in this embodiment, the present disclosure is not particularly limited to this embodiment. The present disclosure is applicable to belt transmission systems for general industries, for example.

EXAMPLES

Belts for Test Evaluation

V-ribbed belts of Examples 1-7 and Comparative Examples 1 and 2 were fabricated. The constitution of each of the belts is also shown in Table 1.

Example 1

As Example 1, a V-ribbed belt was produced in which a compression rubber layer is formed by using a non-crosslinked rubber composition produced by blending 100 parts by mass of ethylene-propylene-diene monomer (EPDM) (manufactured by Dupont Dow Elastomers, trade name of NORDEL IP 4640) as the rubber component with 75 parts by mass of carbon black HAF (manufactured by Tokai Carbon Co., Ltd., trade name of SEAST 3) as a reinforcing agent, 5 parts by mass of a softener (manufactured by Japan Sun Oil Company, Ltd., trade name of SUNPAR 2280), 1 parts by mass of stearic acid (manufactured by NOF Corporation, trade name of BEADS STEARIC ACID "TSUBAKI") as a processing aid, 5 parts by mass of zinc oxide (manufactured by Sakai Chemical Industry Co., Ltd., trade name of ZINC FLOWER No. 1) as a vulcanization aid, 2.3 parts by mass of sulfur (manufactured by Hosoi Chemical Industry Co., Ltd., trade name of OIL SULFUR) as a cross-linker, 5 parts by mass of a resin for rubber compounding (manufactured by Sumitomo Bakelite Co., Ltd., trade name of SUMILITERESIN PR-13355), 4 parts by mass of a vulcanization accelerator (manufactured by Ouchi Shinko Chemical Industrial Co., Ltd., trade name of EP-150), 3 parts by mass of thermally expandable hollow particles A (manufactured by Sekisui Chemical Co., Ltd., trade name of ADVANCELL EHM-303, particle size of 29 μm), and 20 parts by mass of ultra high molecular weight polyethylene resin particles (manufactured by Mitsui Chemicals, Inc., trade name of HIZEX MILLION 240S, average particle size of 120 μm, weight average molecular weight of two million) as the solid particles A, and kneading the resultant blend.

Each of an adhesion rubber layer and a backing rubber layer was made of another rubber composition of EPDM, and a cord was made of twisted yarn of polyethylene naphthalate fibers (PEN). The belt had a belt length of 2280 mm, a belt width of 25 mm, a belt thickness of 4.3 mm, and six V-shaped ribs.

Example 2

As Example 2, a V-ribbed belt was produced by the same method as that of Example 1 except that ultra high molecular weight polyethylene resin particles (manufactured by Heisen Yoko Co. Ltd., trade name of INHANCE UH-1080, average particle size of 180 μm) as solid particles B instead of the solid particles A were blended into the rubber composition forming the compression rubber layer.

Example 3

As Example 3, a V-ribbed belt was produced by the same method as that of Example 1 except that ultra high molecular weight polyethylene resin particles (manufactured by Heisen Yoko Co. Ltd., trade name of INHANCE UH-1700, average particle size of 35 μm) as solid particles C instead of the solid particles A were blended into the rubber composition forming the compression rubber layer with.

Example 4

As Example 4, a V-ribbed belt was produced by the same method as that of Example 1 except that nylon resin particles (manufactured by Unitika Ltd., trade name of A1020LP) as solid particles D instead of the solid particles A were blended into the rubber composition forming the compression rubber layer.

Example 5

As Example 5, a V-ribbed belt was produced by the same method as that of Example 1 except that melamine resin powders (manufactured by SINTOKOGIO, LTD., trade name of PP 80-100, powder size of 106-180 μm) as solid particles E instead of the solid particles A were blended into the rubber composition forming the compression rubber layer.

Example 6

As Example 6, a V-ribbed belt was produced by the same method as that of Example 1 except that thermally expandable hollow particles B (manufactured by Sekisui Chemical Co., Ltd., trade name of ADVANCELL EHM-302, particle size of 21 μm) instead of the hollow particles A were blended into the rubber composition forming the compression rubber layer.

Example 7

As Example 7, a V-ribbed belt was produced by the same method as that of Example 1 except that thermally expandable hollow particles C (manufactured by Sekisui Chemical Co., Ltd., trade name of: ADVANCELL EHM-204, particle size of 40 μm) instead of the hollow particles A were blended into the rubber composition forming the compression rubber layer.

Example 8

As Example 8, a V-ribbed belt was produced by the same method as that of Example 1 except that thermally expandable hollow particles D (manufactured by Sekisui Chemical Co., Ltd., trade name of ADVANCELL EM-501, particle size of 27 μm) instead of the hollow particles A were blended into the rubber composition forming the compression rubber layer.

Example 9

As Example 9, a V-ribbed belt was produced by the same method as that of Example 1 except that 6 parts by mass of a chemical foaming agent (manufactured by Eiwa Chemical Ind. Co., Ltd, trade name of NEOCELLBORN N#1000M) instead of the hollow particles A were blended into 100 parts by mass of the rubber composition forming the compression rubber layer.

Comparative Example 1

As Comparative Example 1, a V-ribbed belt was produced by the same method as that of Example 1 except that no solid particles were blended into the rubber composition forming the compression rubber layer.

Comparative Example 2

As Comparative Example 2, a V-ribbed belt was produced by the same method as that of Example 1 except that ultra high molecular weight polyethylene resin particles (manufactured by Mitsui Chemicals, Inc., trade name of MIPELON XM-220, average particle size of 30 μm, weight average molecular weight of two million) as solid particles F instead of the solid particles A were blended into the rubber composition forming the compression rubber layer.

Comparative Example 3

As Comparative Example 3, a V-ribbed belt was produced by the same method as that of Example 1 except that nylon short fibers (manufactured by Asahi Kasei Corporation, trade name of LEONA 66, fiber length of 1 mm) instead of the solid particles A were blended into the rubber composition forming the compression rubber layer.

Comparative Example 4

As Comparative Example 4, a V-ribbed belt was produced by the same method as that of Example 8 except that no solid particles were blended into the rubber composition forming the compression rubber layer.

TABLE 1

| | Example | | | | | | | | | Comparative example | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| EPDM | 100 | 100 | 100 | 100 | 100 | 100 | 100 | 100 | 100 | 100 | 100 | 100 | 100 |
| HAF Carbon Black | 75 | 75 | 75 | 75 | 75 | 75 | 75 | 75 | 75 | 75 | 75 | 75 | 75 |
| Softener | 5 | 5 | 5 | 5 | 5 | 5 | 5 | 5 | 5 | 5 | 5 | 5 | 5 |
| Stearic Acid | 1 | 1 | 1 | 1 | 1 | 1 | 1 | 1 | 1 | 1 | 1 | 1 | 1 |
| Zinc Oxide | 5 | 5 | 5 | 5 | 5 | 5 | 5 | 5 | 5 | 5 | 5 | 5 | 5 |
| Sulfur | 2.3 | 2.3 | 2.3 | 2.3 | 2.3 | 2.3 | 2.3 | 2.3 | 2.3 | 2.3 | 2.3 | 2.3 | 2.3 |
| Resin for Rubber Compounding | 5 | 5 | 5 | 5 | 5 | 5 | 5 | 5 | 5 | 5 | 5 | 5 | 5 |
| Vulcanization Accelerator | 4 | 4 | 4 | 4 | 4 | 4 | 4 | 4 | 4 | 4 | 4 | 4 | 4 |
| Hollow Particles A | 3 | 3 | 3 | 3 | 3 | | | | | 3 | 3 | 3 | |
| Hollow Particles B | | | | | | 3 | | | | | | | |
| Hollow Particles C | | | | | | | 3 | | | | | | |
| Hollow Particles D | | | | | | | | 3 | | | | | 3 |
| Solid Particles A | 20 | | | | | 20 | 20 | 20 | 20 | | | | |
| Solid Particle B | | 20 | | | | | | | | | | | |
| Solid Particle C | | | 20 | | | | | | | | | | |
| Solid Particle D | | | | 20 | | | | | | | | | |
| Solid Particle E | | | | | 20 | | | | | | | | |
| Solid Particle F | | | | | | | | | | | 20 | | |
| Chemical Foaming Agent | | | | | | | | | 6 | | | | |
| Nylon Short Fiber | | | | | | | | | | | | 20 | |
| Total | 220.3 | 220.3 | 220.3 | 220.3 | 220.3 | 220.3 | 220.3 | 220.3 | 223.3 | 200.3 | 220.3 | 220.3 | 200.3 |

(Test Evaluation Method)

<Average Pore Size>

Surfaces of tips of the ribs and side surfaces of the ribs of the examples 1-9 and the comparative examples 1-4 were observed through an optical microscope, opening sizes of 50-70 pores of each of the surfaces were measured, and the average value thereof was assumed as an average pore size.

<Average Height of Small Protrusions>

Surfaces of tips of the ribs and side surfaces of the ribs of the examples 1-9 and the comparative examples 2-3 were observed at magnification of 400 times through a laser microscope VK-9510 manufactured by KEYENCE CORPORATION, heights of 50-70 small protrusions on each of the surfaces were measured, and the average value thereof was assumed as an average height. The small protrusions of Comparative Example 3 were made of short fibers.

<Peak-to-Valley Distance>

Belt surfaces of the belts of the examples 1-9 and the comparative examples 1-4 were observed at magnification of 400 times through a laser microscope (manufactured by KEYENCE CORPORATION), and the depth of each of the pores and the height of an adjacent one of the small protrusions were measured and added, and the average value of 50-70 of the added measurements was assumed as the peak-to-valley distance.

<Noise Evaluation in Wet State>

Figure 12:
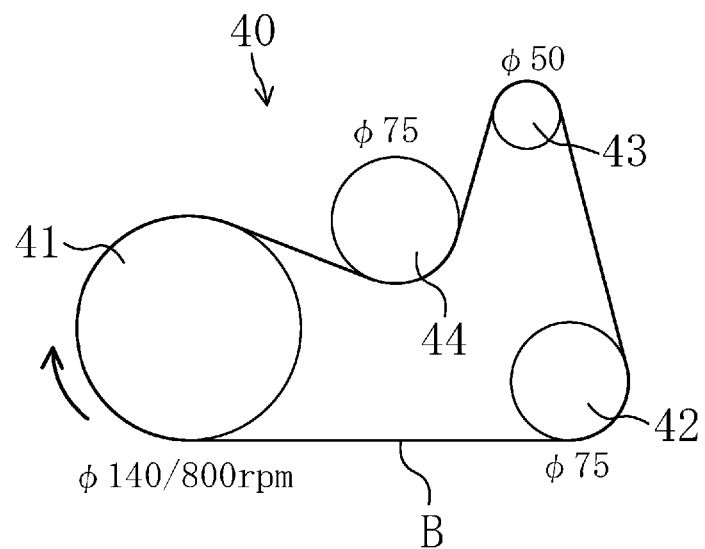
FIG. 12 is a diagram illustrating a layout of pulleys in a belt running test machine used to evaluate noise in a wet state.

FIG. 12 is a diagram showing a layout of pulleys in a belt running test machine 40 used to evaluate noise in a wet state.

The belt running test machine 40 used to evaluate noise in a wet state has a configuration including: a drive pulley 41 which is a ribbed pulley with a pulley diameter of 140 mm; a first driven pulley 42 which is a ribbed pulley with a pulley diameter of 75 mm and which is disposed at a right position relative to the drive pulley 41; a second driven pulley 43 which is a ribbed pulley with a pulley diameter of 50 mm and which is disposed above the first driven pulley 42 and at an upper right position relative to the drive pulley 41; and an idler pulley 44 which is a flat pulley with a pulley diameter of 75 mm and which is disposed midway between the drive pulley 41 and the second driven pulley 43. The belt running test machine 40 used to evaluate noise in a wet state has a configuration such that the V-ribbed belt B is wrapped around these pulleys with the V-shaped ribs of the V-ribbed belt B being in contact with the drive pulley 41, and the first and second driven pulleys 42 and 43 as ribbed pulleys, and with the back side of the V-ribbed belt B being in contact with the idler pulley 44 as a flat pulley.

Each of those V-ribbed belts of Examples 1-9 and Comparative Examples 1-4 was placed on the belt running test machine 40 used to evaluate noise in a wet state in the following manner. The pulleys were positioned so that a tensile force of 49 N per rib was applied to the V-ribbed belt, resistance was provided to the second driven pulley 43 so that current of 60 A flowed through an alternator attached to the second driven pulley 43. The drive pulley 41 was rotated at a rotational speed of 800 rpm under at normal temperature, and water was dropped onto the V-shaped ribs of the V-ribbed belt B in a portion of the V-ribbed belt B which enters the drive pulley 41 at a rate of 1000 ml/min. The situation in which noise is generated in running of the V-ribbed belt B was evaluated by five stages of "loud," "low," "slight," and "none."

<Heat Resistance Durability>

Figure 13:
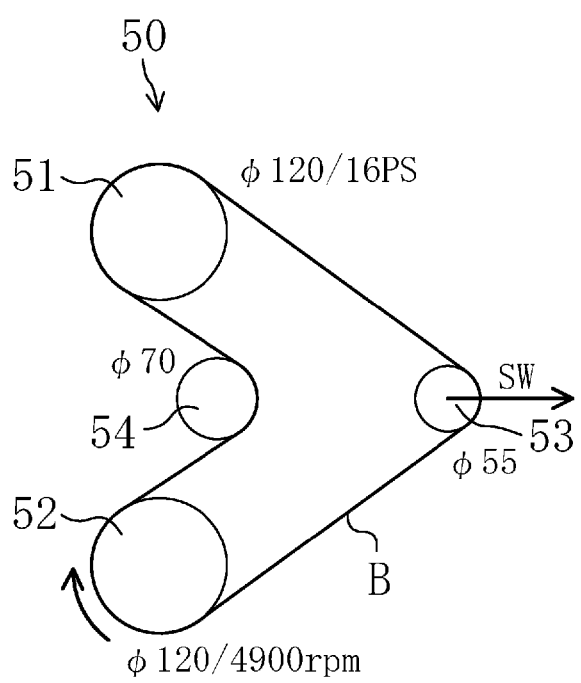
FIG. 13 is a diagram illustrating a layout of pulleys in a belt running test machine used to evaluate heat resistance durability.

FIG. 13 illustrates a layout of pulleys in a belt running test machine 50 used to evaluate heat resistance durability.

The belt running test machine 50 used to evaluate heat resistance durability 50 has a configuration including: a large-diameter driven pulley 51 and a drive pulley 52 which are ribbed pulleys with a pulley diameter of 120 mm and disposed at upper and lower positions, respectively, with a space interposed therebetween; an idler pulley 53 which is a flat pulley with a pulley diameter of 70 mm and is disposed vertically midway between the pulleys 51 and 52; and a small-diameter driven pulley 54 which is a ribbed pulley with a pulley diameter of 55 mm and disposed at a right position relative to the idler pulley 53. The belt running test machine 50 used to evaluate heat resistance durability has a configuration such that the V-ribbed belt B is wrapped around these pulleys with the V-shaped ribs of the V-ribbed belt B being in contact with the large-diameter driven pulley 51, the drive pulley 52 as ribbed pulleys, and with the back side of the V-ribbed belt B being in contact with the idler pulley 53 as a flat pulley. The idler pulley 53 and the small-diameter driven pulley 54 are positioned so that the wrap-around angle of the V-ribbed belt on each of the pulleys 53 and 54 is 90°.

Each of those V-ribbed belts of Examples 1-9 and Comparative Examples 1-4 was placed on the belt running test machine used 50 used to evaluate heat resistance durability. Rotation load of 11.8 kW was applied to the large-diameter driven pulley 51, and a set weight of 834 N was laterally applied to the small-diameter driven pulley 54 so that a tensile force is applied to the V-ribbed belt. The drive pulley 52 was rotated at a rotational speed of 4900 rpm to cause the belt to run at an ambient temperature of 120°. The running time until cracks appeared in the compression rubber layer of the V-ribbed belt B and reached the cord wire was measured.

(Test Evaluation Results)

Figure 14:
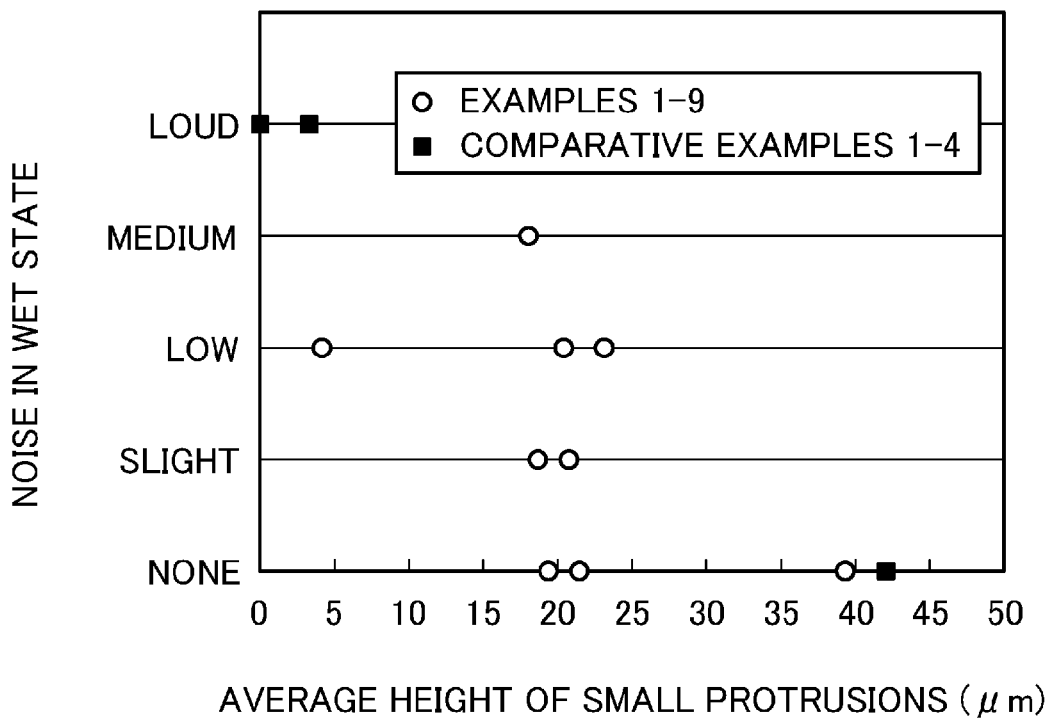
FIG. 14 is a diagram showing a relationship between the average height of small protrusions and noise in a wet state.
Figure 15:
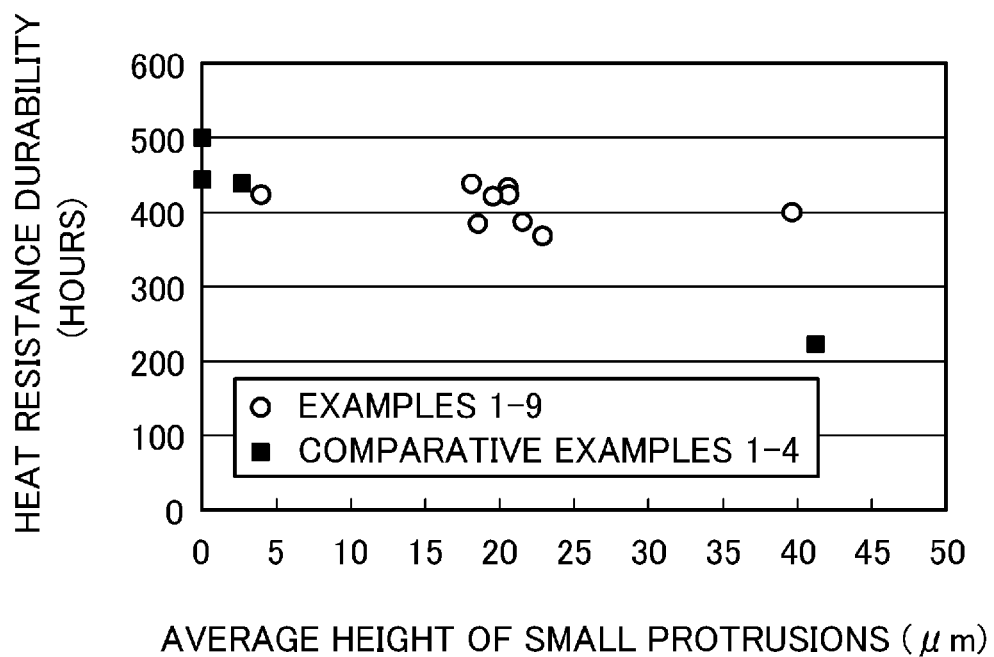
FIG. 15 is a diagram showing a relationship between the average height of small protrusions and heat resistance durability.

The results of the test evaluations are shown in Table 2. FIG. 14 shows a relationship between the average height of the small protrusions and noise in a wet state, and FIG. 15 shows a relationship between the average height of the small protrusions and heat resistance durability.

The average pore size of the pores was as follows: Example 1, 97 μm; Example 2, 94 μm; Example 3, 93 μm; Example 4, 97 μm; Example 5, 96 μm; Example 6, 67 μm; Example 7, 118 μm; Example 8, 53 μm; Example 9, 104 μm; Comparative Example 1, 94 μm, Comparative Example 2, 99 μm; Comparative Example 3, 94 μm; and Comparative Example 4, 55 μm.

The average height of the small protrusions was as follows: Example 1, 19.4 μm; Example 2, 39.4 μm; Example 3, 4.1 μm; Example 4, 18.5 μm; Example 5, 22.8 μm; Example 6, 20.4 μm; Example 7, 21.6 μm; Example 8, 17.9 μm, Example 9, 20.4 μm; Comparative Example 2, 2.7 μm; and Comparative Example 3, 42.0 μm (short fibers).

The peak-to-valley distance was as follows: Example 1, 71 μm; Example 2, 84 μm; Example 3, 49 μm; Example 4, 62 μm; Example 5, 69 μm; Example 6, 56 μm; Example 7, 82 μm; Example 8, 44 μm; Example 9, 65 μm; Comparative Example 1, 43 μm, Comparative Example 2, 46 μm; Comparative Example 3, 86 μm; and Comparative Example 4, 26 μm. In each of Comparative Examples 1 and 4, the maximum depth of the pores was shown.

The noise in a wet state was as follows: Example 1, "none"; Example 2, "none"; Example 3, "low"; Example 4, "slight"; Example 5, "low"; Example 6, "slight"; Example 7, "none"; Example 8, "medium"; Example 9, "low"; Comparative Example 1, "loud"; Comparative Example 2, "loud"; Comparative Example 3, "none"; and Comparative Example 4, "loud".

The heat resistance durability was as follows: Example 1, 421 hours; Example 2, 401 hours; Example 3, 425 hours; Example 4, 386 hours; Example 5, 367 hours; example 6, 423 hours; Example 7, 390 hours; Example 8, 436 hours; Example 9, 431 hours; Comparative Example 1, 445 hours; Comparative Example 2, 438 hours; Example 3, 221 hours; and Comparative Example 4, 504 hours.

The present disclosure is useful for friction drive belts.

What is claimed is:

1. A friction drive belt in which at least a pulley contact portion of a belt body is made of a rubber composition into which any short fibers are not blended, wherein
   numerous pores are formed in a surface of the pulley contact portion of the belt body, and numerous small protrusions having an average height of 4-40 μm are formed to protrude from the surface, and
   the numerous small protrusions are formed by partially exposing solid particles blended into the rubber composition forming the pulley contact portion.

2. The friction drive belt of claim 1, wherein
   the numerous pores are made of partially removed hollow particles blended into the rubber composition forming the pulley contact portion.

TABLE 2

|  | Example | | | | | | | | | Comparative Example | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 |
| Average Pore Size (μm) | 97 | 94 | 93 | 97 | 96 | 67 | 118 | 53 | 104 | 94 | 99 | 94 | 55 |
| Average Height (μm) | 19.4 | 39.4 | 4.1 | 18.5 | 22.8 | 20.4 | 21.6 | 17.9 | 20.4 | — | 2.7 | 42.0 | — |
| Peak-to-valley distance (μm) | 71 | 84 | 49 | 62 | 69 | 56 | 82 | 44 | 65 | 43 | 46 | 86 | 26 |
| Noise in Wet State | None | None | Low | Slight | Low | Slight | None | Medium | Low | Loud | Loud | None | Loud |
| Heat Resistance Durability | 421 | 401 | 425 | 386 | 367 | 423 | 390 | 436 | 431 | 445 | 438 | 221 | 504 |

3. A friction drive belt in which at least a pulley contact portion of a belt body is made of a rubber composition, wherein
   numerous pores are formed in a surface of the pulley contact portion of the belt body, and numerous small protrusions having an average height of 4-40 μm are formed to protrude from the surface, and
   the numerous pores are made of partially removed hollows foamed by a foaming agent blended into the rubber composition forming the pulley contact portion.

4. The friction drive belt of claim 1 or 3, wherein
   an average pore size of the numerous pores is 70-120 μm.

5. The friction drive belt of claim 3, wherein
   the numerous small protrusions are formed by partially exposing solid particles blended into the rubber composition forming the pulley contact portion.

6. The friction drive belt of claim 5, wherein
   the solid particles are made of resin particles.

7. The friction drive belt of claim 6, wherein
   the solid particles are made of ultra high molecular weight polyethylene resin particles.

8. The friction drive belt of claim 1 or 3, wherein
   a peak-to-valley distance between each of the numerous pores and each of the numerous small protrusions is 45 μm or more.

9. The friction drive belt of claim 1 or 3, wherein
a rubber component of the rubber composition forming the pulley contact portion is an ethylene-α-olefin elastomer.

10. The friction drive belt of claim 3, wherein
any short fibers are not blended into the rubber composition forming the pulley contact portion.

11. The friction drive belt of claim 1 or 3, wherein
the belt body is a V-ribbed belt body.

12. A belt transmission system in which the friction drive belt of claim 1 or 3 is wrapped around a plurality of pulleys.

13. The friction drive belt of claim 1, wherein the solid particles are made of resin particles.

14. The friction drive belt of claim 13, wherein the solid particles are made of ultra high molecular weight polyethylene resin particles.

\* \* \* \* \*